(12) United States Patent
Wagle et al.

(10) Patent No.: US 10,301,525 B2
(45) Date of Patent: May 28, 2019

(54) INVERT EMULSION DRILLING FLUIDS

(71) Applicant: Saudi Arabian Oil Company, Dhahran (SA)

(72) Inventors: Vikrant Bhavanishankar Wagle, Abqaiq (SA); Abdullah Saleh Hussain Al-Yami, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 15/480,035

(22) Filed: Apr. 5, 2017

(65) Prior Publication Data

US 2017/0292056 A1    Oct. 12, 2017

Related U.S. Application Data

(60) Provisional application No. 62/319,112, filed on Apr. 6, 2016.

(51) Int. Cl.
*C09K 8/36* (2006.01)

(52) U.S. Cl.
CPC ............ *C09K 8/36* (2013.01); *C09K 2208/10* (2013.01)

(58) Field of Classification Search
None
See application file for complete search history.

(56) References Cited

U.S. PATENT DOCUMENTS

| 3,951,824 A | 4/1976 | Maxson et al. |
| 5,141,920 A | 8/1992 | Bland et al. |
| 5,616,541 A | 4/1997 | Dobson, Jr. et al. |
| 7,278,485 B2 | 10/2007 | Kirsner et al. |
| 7,491,681 B2 | 2/2009 | Dobson, Jr. et al. |
| 7,507,697 B1 | 3/2009 | Shertok et al. |
| 7,645,723 B2 | 1/2010 | Kirsner et al. |
| 2011/0053808 A1* | 3/2011 | Miller ............ C09K 8/36 507/117 |
| 2015/0197998 A1 | 7/2015 | Kapila et al. |
| 2016/0032169 A1* | 2/2016 | Chew ............. C04B 26/04 166/292 |
| 2016/0230070 A1 | 8/2016 | Wagle et al. |

FOREIGN PATENT DOCUMENTS

WO    2015/047210    4/2015

OTHER PUBLICATIONS

Chevalier et al., "Emulsions Stabilized with Solid Nanoparticles: Pickering Emulsions"; Colloids and Surfaces A: Physicochemical and Engineering Aspects; vol. 439; Mar. 7, 2013; pp. 23-34.

Fan et al., "Amphiphilic Silica Nanoparticles at the Decane—Water Interface: Insights from Atomistic Simulations"; Langmuir; vol. 27, No. 9; May 3, 2011; pp. 5264-5274.

(Continued)

*Primary Examiner* — Jeffrey D Washville

(74) *Attorney, Agent, or Firm* — Fish & Richardson P.C.

(57) ABSTRACT

A composition includes an oil phase; a water phase emulsified in the oil phase; a viscosifier including a carbon chain and a polar group disposed along the carbon chain; and a hydrophobic nanomaterial having an average particle size of less than about 1 μm. The hydrophobic nanomaterial including a silane or siloxane molecule having a nonpolar chain disposed on a surface thereof.

21 Claims, 2 Drawing Sheets

(56) References Cited

OTHER PUBLICATIONS

Wagle et al.; "Using Nanoparticles to Formulate Sag-Resistant Invert Emulsion Drilling Fluids"; IADC Society of Petroleum Engineers; SPE/IADC-173004-MS; Jan. 1, 2015; pp. 1-12.
International Search Report and Written Opinion of the International Searching Authority issued in International Application No. PCT/US2017/026117 dated Jul. 5, 2017; 11 pages.
Beck et al., "The Effect of Rheology on Rate of Penetration," SPE/IADC 29368, Copyright 1995, 9 pages.
Bern et al., "Barite Sag: Measurement, Modeling, and Management," SPE Drill & Completion 15 (1), Mar. 2000, 6 pages.
Bern et al., "The Influence of Drilling Variables on Barite Sag," SPE 36670, Copyright 1996, 8 pages.
Dye et al., "Correlation of Ultra-Low Shear Rate Viscosity and Dynamic Barite Sag in Invert-Emulsion Drilling Fluids," SPE 56636, Copyright 1999, 11 pages.
Kenny et al., "Hole-Cleaning Capabilities of an Ester-Based Drilling Fluid System," SPE Drilling & Completion, Mar. 1996, 7 pages.
Maxey, "Rheological Analysis of Static and Dynamic Sag in Drilling Fluids," Annual Transactions of the Nordic Rheology Society, vol. 15, published in 2007, 8 pages.
Mowrey et al., "Achieving the Drilling Performance Benefits of a Clay-Free System in a Variety of Commonly-Used Base Fluids," AADE-06-DF-HO-07, Copyright 2006, 5 pages.
Nicora et al., "High-Density Invert-Emulsion System with Very Low Solids Content to Drill ERD and HPHT Wells," SPE 65000, Copyright 2001, 17 pages.
Saasen et al., "Monitoring of Barite SAG Important in Deviated Drilling," Oil & Gas Journal, Aug. 26, 1991, 15 pages.
Saasen et al., "Prediction of Barite Sag Potential of Drilling Fluids from Rheological Measurements," SPE/IADC 29410, Copyright 1995, 9 pages.
Kaminsky et al., "Viscous Oil Recovery using Solid Stabilized Emulsion," Society of Petroleum Engineers, SPE Annual Technical Conference and Exhibition (SPE 135284), Sep. 19-22, 2010, Florence, Italy, 11 pages.
European Communication Pursuant to Rules 161(1) and 162 EPC issued in European Application No. 17718276.3 dated Nov. 13, 2018, 3 pages.

* cited by examiner

INVERT EMULSION DRILLING FLUIDS

CROSS-REFERENCE TO RELATED APPLICATIONS

This application claims the benefit of priority to U.S. Provisional Application Ser. No. 62/319,112, filed on Apr. 6, 2016, and entitled "Invert Emulsion Drilling Fluids," the contents of which are hereby incorporated by reference.

BACKGROUND

Drilling fluids are used in oil and gas drilling to assist with lubricating the drill bit, ensuring well safety, forming filter cakes to minimize fluid loss into drilling formations, and transporting rock debris to the surface of the well. Invert emulsion drilling fluids, which are emulsions of water in an oil or synthetic base phase, are used in some drilling environments, such as in wells having features that may react to water-based drilling fluids or in high temperature or high pressure environments. Clays are sometimes added to invert emulsion fluids to act as viscosifiers and to stabilize the water-in-oil emulsion of the drilling fluid. In some instances, low gravity solids, such as small calcium carbonate particles or clay-type materials, are added to invert emulsion drilling fluids instead of clay to provide improved thermal stability, resistance to high pressure, and tolerance to contamination.

SUMMARY

In an aspect, a composition includes an oil phase; a water phase emulsified in the oil phase; a viscosifier including a carbon chain and a polar group disposed along the carbon chain; and a hydrophobic nanomaterial having an average particle size of less than 1 μm. The hydrophobic nanomaterial includes a silane or siloxane molecule having a nonpolar chain disposed on a surface thereof.

Embodiments can include one or more of the following features.

The hydrophobic material forms a network. The network is continuous throughout at least a portion of the composition. The composition includes a weighting material incorporated into the network formed by the hydrophobic nanomaterial.

A sag factor of the composition is less than 0.53, such as between 0.50 and 0.53.

The composition is substantially free of clay.

The composition is substantially free of low gravity solids having an average particle size of greater than 5 μm.

The viscosifier includes one or more of a fatty acid, a fatty amine, and a fatty ester.

The silane or siloxane molecule includes hexadecylsilane.

The hydrophobic nanomaterial includes hydrophobic nanosilica. The hydrophobic nanosilica includes nanoparticles of silica having a hydrophobic outer surface.

The average particle size of the hydrophobic nanomaterial is less than 500 nm, such as less than 100 nm, such as between 10 nm and 20 nm.

A yield point of the composition is greater than 10 lb/100 ft2, such as 15 lb/100 ft2.

A plastic viscosity of the composition is less than or equal to 60 CP.

The composition comprises at least 1 ppb of the viscosifier, such as between 1 ppb and 10 ppb of the viscosifier.

The composition comprises at least 6 ppb of the hydrophobic nanomaterial, such as between 6 ppb and 20 ppb of the hydrophobic nanomaterial.

The composition includes an emulsifier.

The composition includes an alkalinity agent.

The composition includes a filtration control agent.

The composition includes a water-soluble salinity agent.

The composition includes a weighting agent, such as one or more of barite, hematite, and manganese tetroxide.

In an aspect, a method includes combining a viscosifier and a hydrophobic nanomaterial in an oil phase, the viscosifier including a carbon chain and a polar group disposed along the carbon chain, the hydrophobic nanomaterial having an average particle size of less than 1 μm. The hydrophobic material includes a silane or siloxane molecule having a nonpolar chain disposed on a surface thereof. The method includes forming a composition including an emulsion of water in the oil phase having the viscosifier and the hydrophobic nanomaterial.

Embodiments can include one or more of the following features.

Forming the composition includes forming a network of the hydrophobic nanomaterial in the composition.

A sag factor of the composition is less than 0.53, such as between 0.50 and 0.53.

The composition is substantially free of clay.

The composition is substantially free of low gravity solids having an average particle size of greater than 5 μm.

The viscosifier includes one or more of a fatty acid, a fatty amine, and a fatty ester.

The hydrophobic nanomaterial includes hydrophobic nanosilica. The hydrophobic nanosilica includes nanoparticles of silica having a hydrophobic outer surface.

The silane or siloxane molecule includes hexadecylsilane.

The average particle size of the hydrophobic nanomaterial is less than 500 nm, such as less than 100 nm, such as between 10 nm and 20 nm.

A yield point of the composition is greater than 10 lb/100 ft2, such as 15 lb/100 ft2.

A plastic viscosity of the composition is less than or equal to 60 CP.

The composition comprises at least 1 ppb of the viscosifier, such as between 1 ppb and 10 ppb of the viscosifier.

The composition comprises at least 6 ppb of the hydrophobic nanomaterial, such as between 6 ppb and 20 ppb of the hydrophobic nanomaterial.

The method includes introducing an emulsifier into the oil phase.

The method includes introducing an alkalinity agent into the oil phase.

The method includes introducing a filtration control agent into the oil phase.

The method includes introducing a water-soluble salinity agent into the oil phase.

The method includes introducing a weighting agent into the oil phase, such as a weighting agent including one or more of barite, hematite, and manganese tetroxide.

The approaches described here can have one or more of the following advantages. The clay-free, LGS-free invert emulsion drilling fluids containing a primary viscosifier and a hydrophobic nanomaterial as described here are resistant to barite sag and thus less prone to drilling problems that can be caused by barite sag, such as mud-weight gradient, stuck-pipe, loss circulation, well-bore instability, and well-control difficulties. These invert emulsion fluids are stable under high temperature and high pressure conditions. The inclusion of a primary viscosifier and a hydrophobic nanomaterial in the invert emulsion drilling fluids described here increases the yield point of the fluids, thus increasing the equivalent circulating density of the fluid. However, the inclusion of a primary viscosifier and a hydrophobic nanomaterial in the invert emulsion drilling fluids described here does not result in any significant increase in plastic viscosity, thus enabling these drilling fluids to be used at a high rate of penetration, which in turn allows fast drilling and reduced rig time. The hydrophobic nanomaterials used in the invert emulsion drilling fluids described here can be hydrophobic silica nanoparticles. Silica is listed in the PLONOR (Poses Little Or No Risk to the environment) list of additives that can be used in the North Sea, and thus the invert emulsion drilling fluids here are environmentally friendly and usable in a variety of geographic locations.

Other features and advantages are apparent from the following description and from the claims.

DETAILED DESCRIPTION

We describe here an approach to reducing barite sag in clay-free, low gravity solids (LGS)-free invert emulsion drilling fluids. The invert emulsion drilling fluids described here contain a plastic viscosifier and a hydrophobic nanomaterial, such as hydrophobic nanosilica. The plastic viscosifier and hydrophobic nanomaterial together reduce the sag factor of the invert emulsion drilling fluid, thus making the drilling fluid resistant to barite sag. In addition, the presence of plastic viscosifier and hydrophobic nanomaterial in the invert emulsion drilling fluid can increase the yield point of the drilling fluid, further improving the performance of the drilling fluid.

Figure 1A:
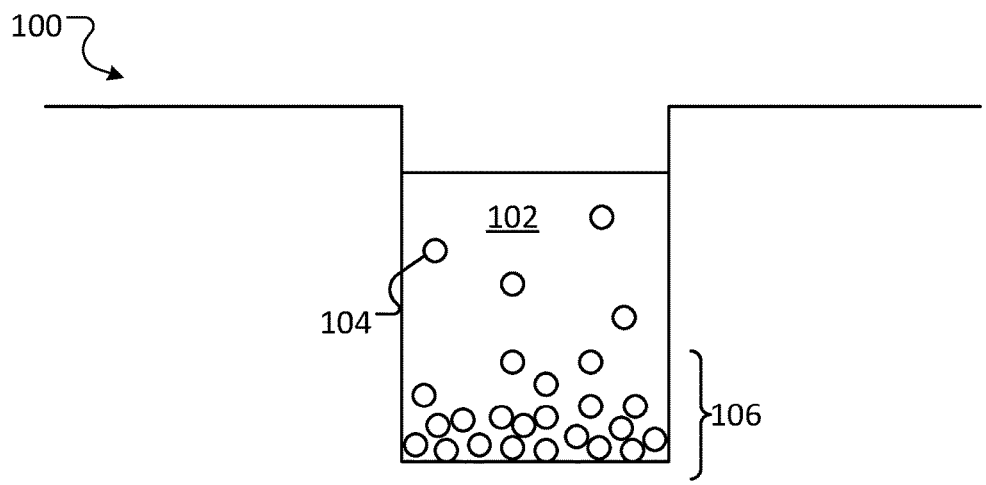
FIGS. 1A and 1B are schematic diagrams of wells.

Referring to FIG. 1A, a well 100, such as an oil well or a natural gas well, is filled with a clay-free, low gravity solids (LGS)-free invert emulsion drilling fluid 102 that contains a weighting agent, such as barite 104, hematite, or manganese tetroxide, or a combination of two or more of these weighting agents. An invert emulsion drilling fluid, such as drilling fluid 102, is formed of an emulsion of water in a continuous base phase of oil or a water-immiscible synthetic fluid. The oil or synthetic fluid can be, for instance, diesel oil, mineral oil, olefins, paraffins, esters, or other material that are immiscible with water and suitable for use in well 100. The volume ratio of oil to water in an invert emulsion drilling fluid can range from about 50:50 to about 95:5, such as from about 70:30 to about 90:10, such as about 70:30, about 80:20, about 90:10, or another ratio.

Invert emulsion drilling fluids are often used in wells in which water-based drilling fluids are inappropriate. For instance, invert emulsion drilling fluids can provide better lubrication performance than water-based drilling fluids. Invert emulsion drilling fluids can maintain stability at higher temperature and higher pressure than water-based drilling fluids. Invert emulsion drilling fluids can be used in wells that include features, such as certain types of clay, that react upon exposure to water-based drilling fluids. Invert emulsion drilling fluids can provide better shale inhibition performance than water-based drilling fluids, for instance, when the water phase of the invert emulsion drilling fluid is a salt brine.

In some invert emulsion drilling fluids, clays, such as organoclay or organo-bentonite, are used as viscosifiers, increasing the viscosity of the drilling fluid and stabilizing the water-in-oil suspension. In some invert emulsion drilling fluids, low gravity solids (LGS) are used as viscosifiers to increase the viscosity of the drilling fluid and to stabilize the emulsion. LGS materials are materials that have a lower density than the weighting agent (such as barite) used to weight the drilling fluid, such as a density of less than 4.20 grams per cubic centimeter ($g/cm^3$) (the density of barite). In some examples, LGS materials have a density of less than about 2.70 $g/cm^3$, such as a density of about 2.60 $g/cm^3$. LGS materials can be small particles, such as micron-sized particles, such as particles with an average size of between about 5 micrometers ($\mu m$) and about 50 $\mu m$, such as 5 $\mu m$, 10 $\mu m$, 20 $\mu m$, 30 $\mu m$, 40 $\mu m$, 50 $\mu m$, or another size. An example of an LGS is small-scale calcium carbonate particles. Clay-free invert emulsion drilling fluids having LGS as viscosifiers are generally more thermally stable, more resistant to high pressure, and more tolerant to contamination, and exhibit lower downhole losses than invert emulsion drilling fluids containing clay. In some LGS-containing invert emulsion drilling fluids, additional LGS material must be added to new batches of these fluids to maintain or bolster the rheological and suspension properties of the fluid.

In invert emulsion drilling fluids that are free of both clay and LGS, such as drilling fluid 102, the emulsified water phase acts as the primary emulsifier. However, the emulsified water phase is generally unable to provide sufficient viscosity to the clay-free and LGS free drilling fluid 102. As a result, the emulsion of the drilling fluid 102 breaks down as the drilling fluid 102 ages, resulting in phase separation of the drilling fluid 102 into water and oil phases. Phase separation in turn causes the suspension characteristics of the drilling fluid 102 to be degraded. The barite 104 weighting material then becomes unable to remain suspended in the drilling fluid 102, and begins to fall out of suspension, accumulating in a mass 106 toward the bottom of the well 100. This precipitation of barite 104 from suspension is referred to as barite sag. Barite sag can give rise to various problems during operation of the well 100, such as the creation of a mud-weight gradient, the occurrence of stuck-pipe, a loss of circulation, well-bore instability, and well-control difficulties. Barite sag can also result in damage to drilling formations, such as fractures, which can lead to mud losses.

Figure 1B:
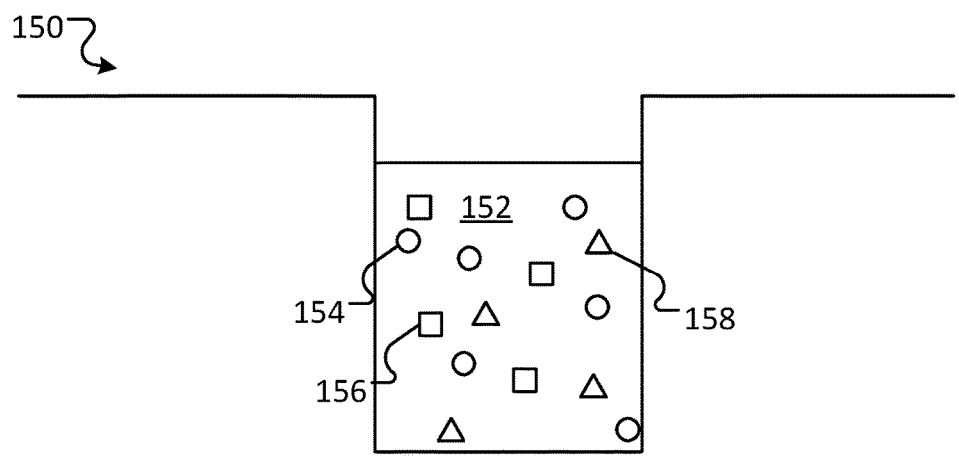

To reduce barite sag in clay-free, LGS-free invert emulsion drilling fluids, other components can be added to the drilling fluid to increase the viscosity and improve the suspension characteristics of the drilling fluid. Referring to FIG. 1B, a well 150, such as an oil well or a natural gas well, is filled with a clay-free, LGS-free invert emulsion drilling fluid 152 that contains a weighting agent, such as barite 154. The drilling fluid 152 can have a composition as described supra for the drilling fluid 102, and can further include a primary viscosifier 156 and a hydrophobic nanomaterial 158. The primary viscosifier 156 and the hydrophobic nanomaterial 158, when present together in the drilling fluid 152, have a synergistic effect that both increases the viscosity of the drilling fluid 152 and stabilizes the water-in-oil emulsion of the drilling fluid 152. As a result, barite sag in the drilling fluid 152 is reduced or eliminated.

The primary viscosifier 156 is a material that increases the viscosity and improves the suspension properties of the drilling fluid 152. The primary viscosifier 156 can be a primarily nonpolar molecule having a nonpolar portion and a smaller polar portion. In some examples, the primary viscosifier 156 can be a fatty acid, a fatty amine, a fatty ester, or another molecule that includes a non-polar carbon chain or ring having a polar group along the carbon chain, such as at an end of the carbon chain. The carbon chain can be linear or cyclical. By carbon chain, we mean a linear chain, a branched chain, or a cyclical chain having a backbone of carbon atoms, such as an alkane chain, an alkene chain, or an alkyne chain. In some examples, the primary viscosifier 156 can be a liquid anionic acrylic co-polymer, a hydrophobic polyanionic cellulose, or a styrene butadiene copolymer latex. In a specific example, the primary viscosifier 156 is a C 36 dimer fatty acid such as Rhemod™ L (a BAROID® product, Halliburton, Houston Tex.). Other examples of primary viscosifiers include BDF™-570 and BDF™-489 (BAROID® products, Halliburton).

The invert emulsion drilling fluid can include between about 1 pounds per barrel (ppb) and about 10 ppb of primary viscosifier, such as about 1 ppb, about 2 ppb, about 3 ppb, about 4 ppb, about 5 ppb, about 6 ppb, about 7 ppb, about 8 ppb, about 9 ppb, about 10 ppb, or another amount of the primary viscosifier. The weight concentration of the primary viscosifier in the invert emulsion drilling fluid can be generally similar to, such as of the same order of magnitude as, the same order of magnitude as the weight concentration of an emulsifier in the invert emulsion drilling fluid, an alkalinity agent in the invert emulsion drilling fluid, a filtration control agent in the invert emulsion drilling fluid, or other components.

Without being bound by theory, it is believed that the primary viscosifier 156 may contribute to increased viscosity and improved emulsion stability through the interaction of the nonpolar carbon chain with the oil phase of the emulsion and the interaction of the polar end group with the water phase of the emulsion.

The hydrophobic nanomaterial 158 further increases the viscosity and improves the suspension properties of the drilling fluid 152. The hydrophobic nanomaterial 158 can be, for instance, nanoparticles, nanorods, nanotubes, or nanomaterials of other shapes. The average particle size of the hydrophobic nanomaterial 158 can be, for instance, less than 1 μm, less than 500 nm, less than 400 nm, less than 300 nm, less than 200 nm, less than 100 nm, less than 50 nm, less than 20 nm, or another size. The average particle size of the hydrophobic nanomaterial 158 can be at least two times less than the average particle size of the barite 154 weighting material, at least three times less, at least ten times less, at least 50 times less, at least 100 times less, at least 500 times less, at least 1000 times less, or another amount less than the average particle size of the barite 154.

The hydrophobic nanomaterial 158 has a surface that is hydrophobic and chemically inert with respect to the primary viscosifier and the other components of the drilling fluid. In some cases, the surface and the interior of the hydrophobic nanomaterial 158 have a generally consistent composition. In some cases, the surface of the hydrophobic nanomaterial 158 is treated to have a different composition than the interior of the hydrophobic nanomaterial 158. For instance, the hydrophobic nanomaterial 158 can be formed of a hydrophilic material that is treated to form a hydrophobic surface. In an example, the hydrophobic nanomaterial 158 can be nanoparticles of silica treated with a silane or siloxane molecule having a nonpolar chain, such as hexadecylsilane, dimethyl dichlorosilane, or another molecule, for instance, such that the silane or siloxane molecule is attached to the exterior surface of the nanoparticles. In a specific example, the hydrophobic nanomaterial 158 is AEROSIL® R816 or R104 hydrophobic nanosilica nanoparticles (Evonik Corporation, Parsippany, N.H.) with a particle size of about 10-20 nm (nanometers).

The invert emulsion drilling fluid can include between about 2 ppb and about 20 ppb of the hydrophobic nanomaterial, such as about 2 ppb, about 4 ppb, about 6 ppb, about 8 ppb, about 10 ppb, about 12 ppb, about 14 ppb, about 16 ppb, about 18 ppb, about 20 ppb, or another amount of the hydrophobic nanomaterial. The weight concentration of the hydrophobic nanomaterial can be between about two times and about four times the weight concentration of the primary viscosifier, such as about two times, about three times, or about four times. The weight concentration of the hydrophobic nanosilica in the invert emulsion drilling fluid can be generally similar to, such as of the same order of magnitude as, the weight concentration of an emulsifier in the invert emulsion drilling fluid, an alkalinity agent in the invert emulsion drilling fluid, a filtration control agent in the invert emulsion drilling fluid, or other components.

Figure 2:
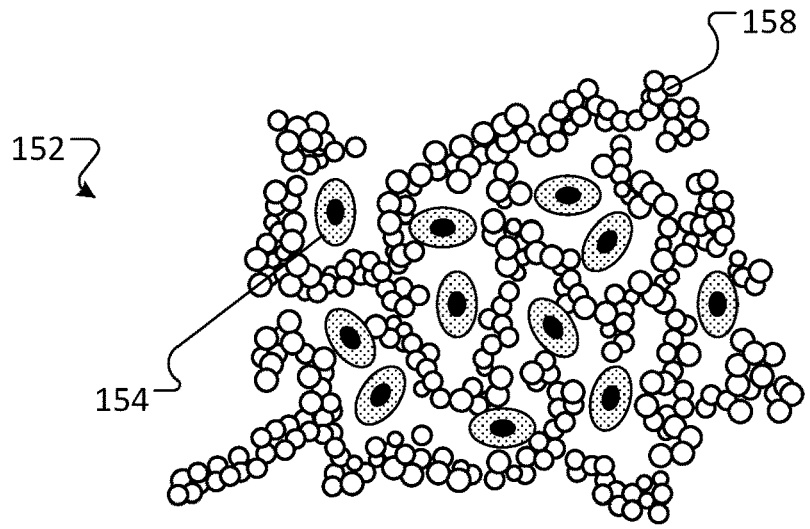
FIG. 2 is a diagram of an invert emulsion fluid.

Without being bound by theory, it is believed that the hydrophobic nanomaterial 158 may encourage the formation and maintenance of the water-in-oil emulsion of the drilling fluid 152 through the small particle size and large surface area of the hydrophobic nanomaterial 158. Furthermore, it is also believed that the organic or hydrophobic moiety of the silane or siloxane chain that imparts hydrophobicity to the nanomaterial can help to stabilize the invert emulsion drilling fluids. For instance, referring to FIG. 2, in a diagram of the invert emulsion fluid, it is believed that the hydrophobic nanomaterial can form a network that incorporates the barite weighting material, thus stabilizing the invert emulsion fluid against settling of the barite. The network can have a continuous morphology throughout all or part of the invert emulsion fluid The clay-free, LGS-free invert emulsion drilling fluid 152 can also include other components. For instance, the drilling fluid 152 can include an emulsifier, such as an oil soluble sulfonate emulsifier, to enhance the stability of the water-in-oil emulsion of the drilling fluid 152. The drilling fluid 152 can include an alkalinity agent, such as lime, to control the pH of the drilling fluid 152. The drilling fluid 152 can include a high-pressure, high-temperature (HPHT) filtration control agent to help reduce HPHT fluid loss. The drilling fluid 152 can include water-soluble compounds, including salts such as calcium chloride or sodium chloride, metal nitrites, metal nitrates, metal hydrates, or other materials that provide salinity to the water phase. For instance, a concentration of between about 10,000 ppm (parts per million) and 350,000 ppm of calcium chloride can be used.

The suspension characteristics of a fluid can be characterized in terms of the sag factor, which is an indication of the degree to which heavier components in the fluid sink toward the bottom of the fluid. In the case of the drilling fluid 152, the sag factor is an indication of the extent to which barite sag has occurred. The sag factor is calculated based on the specific gravity (SG) at the top and bottom of a sample of fluid:

$$\text{Sag Factor} = SG_{bottom}/(SG_{bottom} + SG_{top})$$

A sag factor of greater than about 0.53 indicates that a fluid has the potential to experience barite sag; a sag factor of less than or equal to about 0.53 is generally considered to have good suspension characteristics.

The presence of a primary viscosifier and a hydrophobic nanomaterial in a clay-free, LGS-free invert emulsion drilling fluid improves the suspension properties of the drilling fluid, reducing or eliminating the occurrence of barite sag. For instance, a clay-free, LGS-free drilling fluid including both primary viscosifier and hydrophobic nanomaterial can have a sag factor of less than 0.53, such as between about 0.50 and about 0.53, such as about 0.50, 0.51, or 0.52.

The presence of a primary viscosifier and a hydrophobic nanomaterial improves the rheological properties, such as the yield point, of a clay-free, LGS-free invert emulsion drilling fluid. The presence of both primary viscosifier and hydrophobic nanomaterial can increase the yield point of a clay-free, LGS-free drilling fluid by at least about three times, such as by about three times, about four times, about five times, about six times, about seven times, about eight times, about nine times, about ten times, or by another amount as compared to a clay-free, LGS-free drilling fluid that does not have both primary viscosifier and hydrophobic nanosilica (e.g., a drilling fluid with neither primary viscosifier nor hydrophobic nanosilica or a drilling fluid with only one of primary viscosifier or hydrophobic nanosilica). For instance, a clay-free, LGS-free drilling fluid including both primary viscosifier and hydrophobic nanomaterial can have a yield point of least about 10 pounds per 100 square feet (lb/100 ft$^2$), such as about 10 lb/100 ft$^2$, about 12 lb/100 ft$^2$, about 14 lb/100 ft$^2$, about 16 lb/100 ft$^2$, about 18 lb/100 ft$^2$, about 20 lb/100 ft$^2$, or another value of the yield point. A drilling fluid with a high yield point generally has a high equivalent circulating density and can enable efficient cleaning of the well. Although the yield point of a clay-free, LGS-free invert emulsion drilling fluid can be significantly increased by the presence of a primary viscosifier and a hydrophobic nanomaterial, the effect of the primary viscosifier and the hydrophobic nanomaterial on the plastic viscosity of the invert emulsion drilling fluid can be relatively smaller. For instance, the plastic viscosity of a clay-free, LGS-free drilling fluid including both primary viscosifier and hydrophobic nanomaterial can be within about 70% of the plastic viscosity of an equivalent drilling fluid without primary viscosifier or hydrophobic nanomaterial, such as within about 70%, within about 60%, within about 50%, within about 40%, within about 30%, within about 25%, within about 20%, within about 10%, or within another amount. For instance, a clay-free, LGS-free drilling fluid including both primary viscosifier and hydrophobic nanomaterial can have a plastic viscosity of at least about 25 centipoise (cP) or less than about 60 cP, such as a plastic viscosity of 25 cP, 28 cP, 30 cP, 33 cP, 35 cP, 38 cP, 40 cP, 43 cP, 45 cP, 48 cP, 50 cP, 53 cP, 55 cP, 58 cP, 60 cP, or another value of plastic viscosity. Maintaining a relatively low plastic viscosity enables the drilling fluid that includes primary viscosifier and hydrophobic nanomaterial to be used at a high rate of penetration, thereby allowing fast drilling and reduced rig time.

The rheological properties of a clay-free, LGS-free drilling fluid including both a primary viscosifier and a hydrophobic nanomaterial can be stable against high pressure and high temperature conditions such as those found in high pressure or high temperature drilling formations. For instance, the plastic viscosity and yield point of a clay-free, LGS-free drilling fluid including both a primary viscosifier and a hydrophobic nanomaterial can remain substantially constant in the face of high temperature, such as temperatures of at least about 150° F. or temperatures of at least about 250° F. In some examples, a clay-free, LGS-free drilling fluid including both a primary viscosifier and a hydrophobic nanomaterial can be used in environments with temperatures up to about 450° F.

Figure 3:
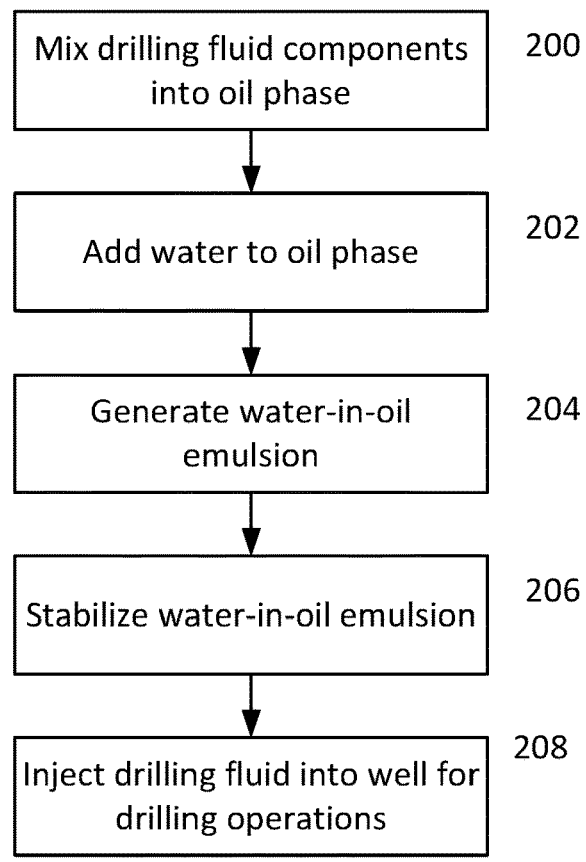
FIG. 3 is a flow chart.

FIG. 3 depicts a general process for the formulation of clay-free, LGS-free invert emulsion drilling fluids including a primary viscosifier and a hydrophobic nanomaterial. Components of the drilling fluid are mixed into the oil phase of the drilling fluid (200). The components that are mixed into the oil phase include the primary viscosifier and the hydrophobic nanomaterial. Other components, such as one or more of an emulsifier, an alkalinity agent such as lime, a filtration control agent, a salinity agent such as calcium chloride or sodium chloride, and a weighting agent such as barite or manganese tetroxide, are also added to the oil phase. Water is added to the mixed oil phase (202) and a water-in-oil emulsion is generated (204). For instance, the water can be added slowly under constant stirring, agitation, or sonication to encourage the emulsification of the water. The water-in-oil emulsion is allowed to stabilize (206), following which the fluid can be injected into a well for drilling operations (208).

EXAMPLE—FORMULATION AND CHARACTERIZATION OF INVERT EMULSION FLUIDS

The rheological properties and suspension characteristics of clay-free, LGS-free invert emulsion drilling fluids were studied to determine the effect of primary viscosifier and hydrophobic nanosilica on the rheological properties and suspension characteristics of the fluids.

The yield point and plastic viscosity of the fluids were determined using a FANN® Model 35 viscometer (Fann Instrument Company, Houston, Tex.), which is a direct-indicating rheometer powered by an electric motor. The rheometer includes two concentric cylinders: an inner cylinder called a bob and an outer cylinder called a rotor sleeve. For each fluid tested, a fluid sample was placed in a thermostatically controlled cup and the temperature of the fluid in the cup was adjusted to 120±2° F. The temperature-controlled fluid sample in the cup was placed in the annular space between the two concentric cylinders of the rheometer. The rotor sleeve was driven at a constant rotational velocity, producing a torque on the bob. A torsion spring restrains the movement of the bob, and a dial attached to the bob indicates the displacement of the bob. The dial readings were measured at various rotor speeds, including 3, 6, 100, 200, 300, and 600 revolutions per minute (rpm). The experiments were conducted in accordance with standard procedures set forth in Recommended Practice 13B-2, Recommended Practice for Field Testing of Oil-based Drilling Fluids, Fourth Edition, American Petroleum Institute (API), Mar. 1, 2005.

The plastic viscosity (PV) of a fluid represents the viscosity of the fluid when rheological test results are extrapolated to infinite shear rate according to the Bingham-Plastic rheological model. The plastic viscosity of a fluid can be calculated using the 300 rpm and 600 rpm shear rate readings determined as described supra according to the following equation:

$$PV=(600 \text{ rpm reading})-(300 \text{ rpm reading})$$

The yield point (YP) of a fluid is defined as the value obtained from the Bingham-Plastic rheological model when the rheological test results are extrapolated to a shear rate of zero. The yield point of a fluid can be determined according to the following equation:

$$YP=(300 \text{ rpm reading})-PV.$$

The yield stress, or Tau zero, of a fluid is the stress that causes the fluid to flow or yield. The yield stress can be extrapolated from rheological test results at shear rates of 3, 6, 100, 200, 300, and 600 rpm by applying a least-squares fit or curve fit to the Herchel-Bulkley rheological model. Alternatively, the yield stress can be estimated by calculating the low-shear yield point (LSYP) according to the following equation:

LSYP=2*(3 rpm reading)−(6 rpm reading).

Suspension characteristics of each fluid were determined by measuring top oil separation and by calculating the sag factor of the fluid following static aging. Top oil separation was quantified as the volume of base oil separated from the fluid after static aging, as drawn from the static aging cell with a syringe. The sag factor was determined by drawing 10 mL aliquots of fluid from the top and bottom of the fluid after static aging and measuring the weight of each aliquot on an analytical balance. The equation for sag factor is given supra.

Fluid loss characteristics were determined on a 175 mL capacity HPHT filter press cell following API 13B-2 recommendations.

Formulations of invert emulsion drilling fluids were prepared and characterized to demonstrate the effect of primary viscosifier or hydrophobic nanosilica on the suspension characteristics of the invert emulsion drilling fluid. These formulations included SAFRA (Safra Company Limited, Saudi Arabia) as a base oil. The primary viscosifier used in these formulations was Rhemod™ L and the hydrophobic nanomaterial was AEROSIL® R104, which is a hydrophobic fumed nanosilica that is formed by surface treating with an octamethylcyclotetrasiloxane. The physical properties of AEROSIL® R104 are given in Table 1. Without being bound by theory, it is believed that the high surface area and small size of the nanosilica plays a role in the improved suspension characteristics of the invert emulsion fluids containing both primary viscosifier and nanosilica. These formulations of invert emulsion fluids also included LE SUPERMUL™ (Halliburton), an emulsifier. The formulations included lime, an alkalinity agent. The formulations included ADAPTA® (Halliburton), a filtration control agent. The formulations also included calcium chloride, barite, and water. These formulations of invert emulsion fluids had a density of 12 pounds per gallon (ppg), an oil-to-water ratio (OWR) of 70:30, and a water phase salinity (WPS) of 250,000 ppm. The specific composition of each formulation is given in Table 2.

TABLE 1

Properties of AEROSIL ® R104 hydrophobic fumed nanosilica

| Property and test method | Value |
|---|---|
| Specific surface area (BET) | 150 ± 25 |
| Carbon content | 1.0-2.0 |
| Tamped density (ex plant) according to DIN EN ISO 787/11, August 1983 | approx. 50 |
| Moisture (ex plant) 2 hours at 105° C. | — |
| pH in 4% dispersion | ≥4.0 |
| $SiO_2$ content based on ignited material | ≥99.8 |

Four different formulations of invert emulsion drilling fluids were prepared and characterized, the compositions of which are given in Table 2. Comparative formulation 0 included neither a primary viscosifier nor hydrophobic nanosilica. Comparative formulations 1 and 2 included either a primary viscosifier or hydrophobic nanosilica, but not both. Formulation 3 included both a primary viscosifier and hydrophobic nanosilica.

Each invert emulsion drilling fluid formulation was prepared according to the following procedure. The components of the fluid were added sequentially in the order listed in Table 2 and mixed in a stainless steel mixing cup on a five spindle multimixer model at 11500 rpm after the addition of each component for the amount of time indicated in the tables. The fluid was then hot rolled in an HPHT stainless steel cell in a hot rolling oven for 16 hours at 250° F. Following the hot rolling, a portion of the fluid was removed for measurement of rheological properties as described supra. The remaining fluid was mixed on the multimixer for 5 minutes and placed into an HPHT stainless steel aging cell to be static aged for 24 hours at 250° F. Each static aged fluid was characterized for rheological properties and suspension characteristics.

TABLE 2

Formulation, rheological properties, and suspension characteristics of clay-free, LGS-free invert emulsion drilling fluids containing neither primary viscosifier nor hydrophobic nanosilica (Comparative Formulation 0), primary viscosifier or hydrophobic nanosilica (Comparative Formulations 1 and 2), and both primary viscosifier and hydrophobic nanosilica (Formulation 3).

| 12 ppg 70/30 OWR | Mixing time | Comparative Formulation 0 | Comparative Formulation 1 | Comparative Formulation 2 | Formulation 3 |
|---|---|---|---|---|---|
| SAFRA Oil, ppb (Base oil) | | 147.9 | 150.3 | 148.84 | 148.84 |
| LE SUPERMUL, ppb (emulsifier) | 2 | 10.00 | 10.00 | 10.00 | 10.00 |
| LIME, ppb (alkalinity agent) | 2 | 1.50 | 1.50 | 1.50 | 1.50 |
| RHEMOD L, ppb (viscosifier) | 5 | 0.00 | 3.00 | 0.00 | 3.00 |
| ADAPTA, ppb (filtration control agent) | 5 | 2.00 | 2.00 | 2.00 | 2.00 |
| AEROSIL ® Nanosilica R 104, ppb (hydrophobic nanosilica) | 5 | 0.00 | 0.00 | 10.00 | 10.0 |
| CaCl2, ppb | 5 | 29.50 | 29.60 | 29.30 | 29.30 |
| Water, ppb | | 84.9 | 85.30 | 84.50 | 84.50 |
| Barite, ppb (weighting agent) | 10 | 229.9 | 222.2 | 224.74 | 221.74 |

TABLE 2-continued

Formulation, rheological properties, and suspension characteristics of clay-free,
LGS-free invert emulsion drilling fluids containing neither primary viscosifier nor
hydrophobic nanosilica (Comparative Formulation 0), primary viscosifier or hydrophobic
nanosilica (Comparative Formulations 1 and 2), and both primary viscosifier and
hydrophobic nanosilica (Formulation 3).

|  | Fluid 0 static aged for 24 hours at 250 F. | Fluid 1 static aged for 24 hours at 250 F. | Fluid 2 static aged for 24 hours at 250 F. | Fluid 3 static aged for 24 hours at 250 F. |
|---|---|---|---|---|
| 600 rpm | Fluid was very | 30 | 50 | 75 |
| 300 rpm | thin after hot | 17 | 26 | 43 |
| 200 rpm | rolling. | 12 | 18 | 32 |
| 100 rpm | Accurate | 8 | 10 | 19 |
| 6 rpm | rheology | 2 | 2 | 4 |
| 3 rpm | measurement | 1.5 | 1.5 | 3 |
| PV | not feasible. | 13 | 24 | 32 |
| YP |  | 4 | 2 | 11 |
| GELS 10 sec |  | 2 | 1.7 | 5 |
| GELS 10 min |  | 2 | 2 | 8 |
| Sag factor | N/A: Barite bed | 0.57 | 0.64 | 0.504 |
| Oil separation | 100 ml | 85 ml | 60 ml | 0.2 cm |

These results show that an invert emulsion fluid with either primary viscosifier or hydrophobic nanosilica, but not both, has a sag factor that is greater than 0.53, and thus neither the primary viscosifier nor the hydrophobic nanosilica alone is capable of preventing barite sag in the invert emulsion fluid. Neither primary viscosifier alone or hydrophobic nanosilica alone results in an improvement in the suspension characteristics of the invert emulsion fluid, and neither component alone can prevent the occurrence of barite sag in the invert emulsion fluid.

Comparative Formulation 0, with neither primary viscosifier nor hydrophobic nanosilica, exhibited poor rheological characteristics. The static aged fluid was very thin, preventing accurate rheological measurements from being obtained. In addition, a bed of barite accumulated at the bottom of the HPHT cell during static aging, and thus no sag factor could be measured.

The presence of both primary viscosifier and hydrophobic nanosilica together gives rise to a sag factor that is less than 0.53, indicating that the primary viscosifier and the hydrophobic nanosilica together have a synergistic effect that can improve the suspension characteristics of the invert emulsion fluid and can reduce or eliminate the occurrence of barite sag in these invert emulsion drilling fluids. Top oil separation was also significantly reduced by the presence of both primary viscosifier and hydrophobic nanosilica, indicating that the emulsion of these fluids is stabilized by the presence of primary viscosifier together with hydrophobic nanosilica. The static aging time and temperature and the amount of primary viscosifier and hydrophobic nanosilica in the invert emulsion drilling fluid had little effect on the suspension characteristics of the fluid.

The rheological properties of the invert emulsion fluids are also improved by the presence of both primary viscosifier and hydrophobic nanosilica, but again, neither the primary viscosifier alone nor the hydrophobic nanosilica alone has a significant effect on the rheological properties. The yield point of Formulation 3, which contained both primary viscosifier and hydrophobic nanosilica, was increased by at least a factor of about 3 over the yield points of Comparative Formulations 1 and 2.

The results shown in Table 2 indicate that the presence of both primary viscosifier and hydrophobic nanosilica together can effectively reduce or minimize the occurrence of barite sag in a clay-free, LGS-free invert emulsion drilling fluid and furthermore can increase the yield point of the drilling fluid.

Further formulations of invert emulsion fluids were characterized to determine the stability against static aging and hot rolling at different temperatures of invert emulsion fluids having both primary viscosifier and hydrophobic nanosilica. The base oil used in these formulations of invert emulsion drilling fluids ESCAID™ 110 (ExxonMobil, Irving, Tex.), which is a hydrocarbon base oil including carbon chains of length 11 (C11) to 14 (C14), including n-alkanes, iso-alkanes, cyclics, and less than about 2% aromatics. The primary viscosifier used in these formulations was Rhemod™ L. The hydrophobic nanomaterial was AEROSIL® R816, which is a hydrophobic fumed nanosilica that is formed by surface treating AEROSIL® 200 hydrophilic fumed nanosilica with a hexadecylsilane. The physical properties of AEROSIL® R816 are given in Table 3. These formulations of invert emulsion fluids also included EZ MUL® NT (Halliburton), an emulsifier. The formulations also included lime, ADAPTA®, calcium chloride, water, and barite. These formulations of invert emulsion drilling fluids had a density of 12 ppg, an oil-to-water ratio (OWR) of 70:30, and a water phase salinity of 250,000 ppm. The specific composition of each formulation is given in Table 4.

TABLE 3

Properties of AEROSIL ® R816 hydrophobic fumed nanosilica

| Property and test method | Value |
|---|---|
| Specific surface area (BET) | 190 ± 20 m$^2$/g |
| Carbon content | 0.9-1.8 wt. % |
| Tamped density (ex plant) according to DIN EN ISO 787/11, August 1983 | approx. 60 g/L |
| Moisture (ex plant) 2 hours at 105° C. | ≤1.0 wt. % |
| pH in 4% dispersion | 4.0-5.5 |
| SiO$_2$ content based on ignited material | ≥99.8 wt. % |

Formulations 4 and 5, the compositions of which are given in Table 4, were processed as described supra, with the exception of the static aging and hot rolling temperatures. One sample of Formulation 4 was static aged at 250° F. for 24 hours followed by hot rolling for 16 hours at 250° F. A second sample of Formulation 4 was static aged at 150° F. for 120 hours followed by hot rolling for 16 hours at 250° F. to measure the effect of a long, lower temperature static aging on the suspension characteristics of the invert emulsion fluid. Formulation 5, which included a higher concentration of both primary viscosifier and hydrophobic nanosilica than Formulation 4, was static aged at 300° F. for 24 hours followed by hot rolling at 300° F. for 16 hours to measure the effect of exposure to high temperatures on the suspension characteristics of the invert emulsion fluid. Each static aged fluid was characterized for rheological properties and suspension characteristics.

TABLE 4

Formulation, rheological properties, and suspension characteristics of clay-free, LGS-free invert emulsion drilling fluids containing both a primary viscosifier and hydrophobic nanosilica.

| | | 12 ppg 70/30 OWR | | | |
|---|---|---|---|---|---|
| Formulation no. | | 4 | Fluid 4 | Fluid 4 | 5 | Fluid 5 |
| | Mixing time, min | | was static aged | was static aged | | was static aged |
| ESCAID 110, bbl (Base oil) | | 150.84 | @ 250° F. 24 hrs | @ 150° F. 120 hrs | 147.00 | @ 300° F. 24 hrs |
| EZ MUL NT, ppb (emulsifier) | 2 | 10.00 | | | 11.00 | |
| LIME, ppb (alkalinity agent) | 2 | 1.50 | | | 1.50 | |
| RHEMOD L, ppb (viscosifier) | 5 | 3.00 | | | 5.00 | |
| ADAPTA, ppb (filtration control agent) | 5 | 2.00 | | | 3.00 | |
| AEROSIL ® R 816, ppb (hydrophobic nanosilica) | 5 | 8.00 | | | 12.00 | |
| $CaCl_2$, ppb | | 29.30 | | | 29.30 | |
| Water, ppb | 5 | 84.50 | | | 83.53 | |
| Barite, ppb (weighing agent) | 10 | 221.74 | | | 214.96 | |
| Hot rolled at 250° F. (Formulation 4) or 300° F. (Formulation 5), 16 hours | | | | | | |
| Yield stress at 600 rpm | | 75 | 73 | | 83 | 88 |
| Yield stress at 300 rpm | | 45 | 44 | | 50 | 52 |
| Yield stress at 200 rpm | | 35 | 34 | | 39 | 40 |
| Yield stress at 100 rpm | | 22 | 20 | | 26 | 28 |
| Yield stress at 6 rpm | | 5 | 6 | | 7 | 6 |
| Yield stress at 3 rpm | | 5 | 5 | | 6 | 6 |
| Plastic Viscosity | | 30 | 29 | | 33 | 36 |
| Yield Point | | 15 | 15 | | 17 | 16 |
| Low-Shear Yield Point | | 5 | 4 | | 5 | 6 |
| GELS 10 sec | | 7 | 8 | | 7 | 8 |
| GELS 10 min | | 20 | 22 | | 30 | 32 |
| HTHP, ml/30 min (250° F.) | | | | | 4.0 | 5 |
| Sag factor | | | 0.50 | 0.5 | | 0.52 |
| Oil separation | | | 0.2 cm | 0.2 cm | | 0.5 cm/ 4 ml |

These results show that the rheological properties and suspension characteristics of invert emulsion fluids containing both primary viscosifier and hydrophobic nanosilica are relatively independent of temperature.

Other implementations are also within the scope of the following claims.

What is claimed is:

1. A composition comprising:
    an oil phase;
    a water phase emulsified in the oil phase;
    a viscosifier including a carbon chain and a polar group disposed along the carbon chain; and
    a hydrophobic nanomaterial having an average particle size of less than about 1 μm, the hydrophobic nanomaterial including a silane or siloxane molecule having a nonpolar chain disposed on a surface thereof, wherein a weight concentration of the hydrophobic nanomaterial in the composition is between about two times and twenty times a weight concentration of the viscosifier in the composition, wherein a sag factor of the composition is less than 0.53.

2. The composition of claim 1, wherein the hydrophobic nanomaterial forms a network.

3. The composition of claim 2, wherein the network is continuous throughout at least a portion of the composition.

4. The composition of claim 2, wherein the composition comprises a weighting material incorporated into the network formed by the hydrophobic nanomaterial.

5. The composition of claim 1, wherein a sag factor of the composition is between 0.50 and 0.53.

6. The composition of claim 1, wherein the composition is substantially free of clay.

7. The composition of claim 1, wherein the composition is substantially free of low gravity solids having an average particle size of greater than 5 µm.

8. The composition of claim 1, wherein the viscosifier includes one or more of a fatty acid, a fatty amine, and a fatty ester.

9. The composition of claim 1, wherein the silane or siloxane molecule includes hexadecylsilane.

10. The composition of claim 1, wherein the hydrophobic nanomaterial includes hydrophobic nanosilica.

11. The composition of claim 6, wherein the hydrophobic nanosilica includes nanoparticles of silica having a hydrophobic outer surface.

12. The composition of claim 1, wherein the average particle size of the hydrophobic nanomaterial is less than 100 nm.

13. The composition of claim 1, wherein a yield point of the composition is greater than 10 lb/100 ft2.

14. The composition of claim 1, wherein a plastic viscosity of the composition is less than or equal to 60 CP.

15. The composition of claim 1, wherein the composition comprises at least 1 ppb of the viscosifier.

16. The composition of claim 1, wherein the composition comprises at least 6 ppb of the hydrophobic nanomaterial.

17. The composition of claim 1, including one or more of an emulsifier, an alkalinity agent, a filtration control agent, and a water-soluble salinity agent.

18. The composition of claim 1, including a weighting agent.

19. The composition of claim 18, wherein the weighting agent comprises one or more of barite, hematite, and manganese tetroxide.

20. The composition of claim 1, wherein the weight concentration of the hydrophobic nanomaterial in the composition is between about two times and ten times the weight concentration of the viscosifier in the composition.

21. The composition of claim 20, wherein the weight concentration of the hydrophobic nanomaterial in the composition is between about two times and about four times the weight concentration of the viscosifier in the composition.

* * * * *